United States Patent [19]

Nagashima

[11] Patent Number: 4,714,274

[45] Date of Patent: Dec. 22, 1987

[54] SEAT BELT RETRACTOR

[75] Inventor: Hideyuki Nagashima, Yokohama, Japan

[73] Assignee: Nissan Motor Co., Ltd., Japan

[21] Appl. No.: 864,484

[22] Filed: May 19, 1986

[30] Foreign Application Priority Data

May 23, 1985 [JP] Japan .................. 60-109246

[51] Int. Cl.⁴ .............................................. B60R 21/10
[52] U.S. Cl. ................................... 280/801; 180/268; 280/806; 297/475
[58] Field of Search ............... 180/268; 280/801, 802, 280/803, 804, 805, 806, 808; 297/475, 474, 483

[56] References Cited

U.S. PATENT DOCUMENTS

| 4,310,175 | 1/1982 | Pickett ............................ 280/801 |
| 4,384,735 | 5/1983 | Maeda et al. ..................... 280/801 |
| 4,534,441 | 8/1985 | Kamijo et al. .................... 280/806 |
| 4,616,141 | 10/1986 | Hollowell ........................ 280/801 |

FOREIGN PATENT DOCUMENTS 52-9891  3/1977  Japan .

Primary Examiner—Richard A. Bertsch
Attorney, Agent, or Firm—Leydig, Voit & Mayer

[57] ABSTRACT

In a seat belt retractor including a housing, a take-up shaft rotatably mounted to the housing, a spring for biasing the take-up shaft in a belt retracting direction, a gear mechanism operatively connected to the belt take-up shaft, a tensionless mechanism operatively connected to the gear mechanism and operable to prevent the take-up shaft from rotating in the belt retracting direction and a motor actuated slack control mechanism operatively connected to the gear mechanism and operable to rotate the belt take-up shaft, there is provided a control unit constructed of a computer in which under normal driving posture of a driver (or belt wearer), an appropriate belt slack is automatically provided depending upon a vehicle speed, and upon posture change of the driver for reverse driving of the vehicle, a tensionless state is established in the retractor with the seat belt which has been drawn out by a certain amount due to the posture change of the driver.

8 Claims, 11 Drawing Figures

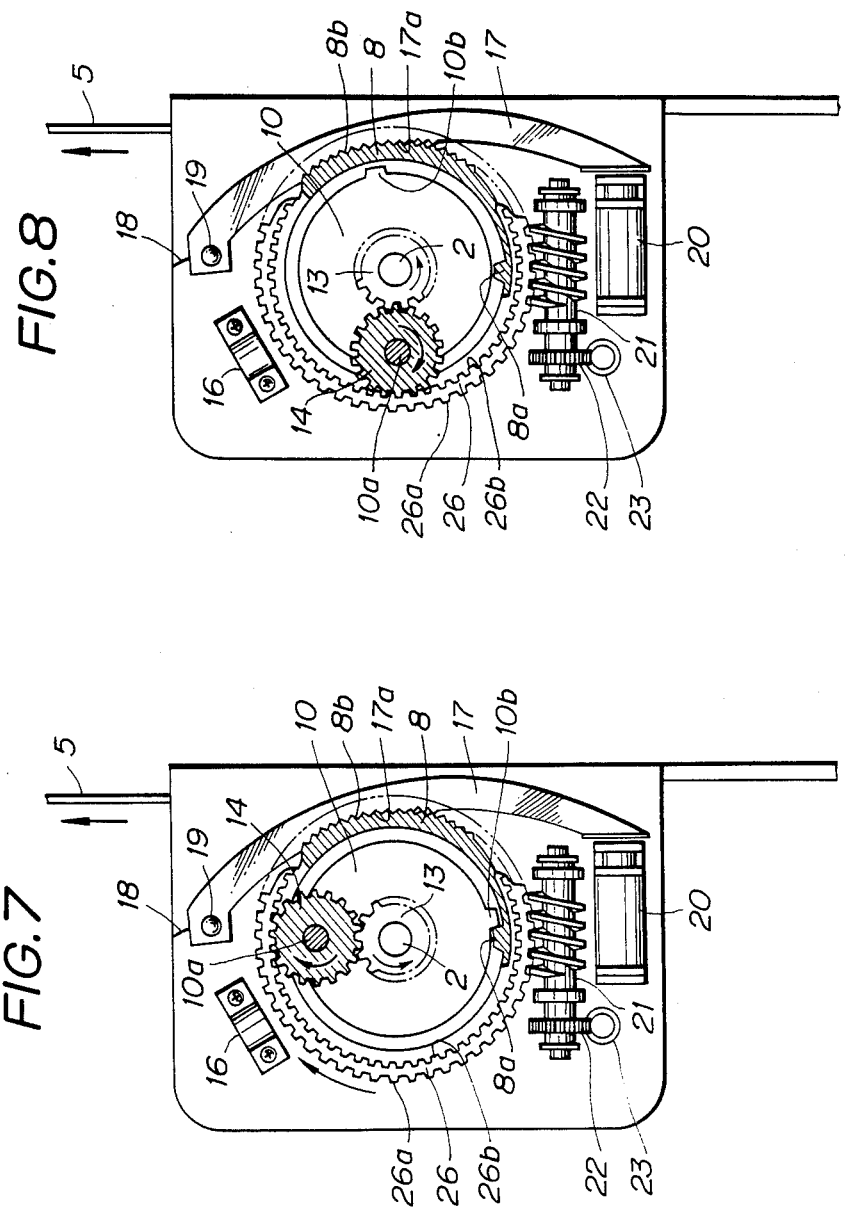

SEAT BELT RETRACTOR

BACKGROUND OF THE INVENTION

1. Field of the Invention

The present invention relates in general to a seat belt retractor, and more particularly to a seat belt retractor with an electronically controlled tensionless mechanism.

2. Description of a Prior Art

Japanese Patent Application Second Provisional Publication No. 52-9891 shows a conventional seat belt retractor with an electrical controlled tensionless mechanism. In the known retractor, an electric motor is operated just after a seat occupant has worn a seat belt so as to rotate a belt take-up shaft in a belt feeding direction by a predetermined amount of slack. This known retractor, however, has a drawback that since once the tensionless state is established, the belt take-up shaft is locked and thus prevented from rotating in the belt feeding direction, the belt can not be pulled out of the retractor further, thus restraining the seat occupant from changing his or her sitting posture. This becomes much severer when the driver wearing the belt intends to turn back for driving the vehicle in reverse. That is, upon such requirement, the driver has to switch OFF the electric controller for releasing the tensionless state of the seat belt. However, the switch OFF manipulation is troublesome and the driver must carry out the reverse driving while feeling uncomfortable tension applied to him or her by the seat belt.

SUMMARY OF THE INVENTION

It is therefore an essential object of the present invention to provide a seat belt retractor with an electronically controlled tensionless mechanism, which is free of the above-mentioned drawback.

According to the present invention, there is provided a seat belt retractor in which under normal driving posture of the driver (belt wearer), an appropriate belt slack is provided depending upon a vehicle speed to secure the safety of him or her under control of a first output means, and upon detection posture change of the driver for a reverse driving, a tensionless state is established in the retractor with the seat belt which has been drawn out by a certain amount due to the posture change of the driver, under control of a second output means.

According to the present invention, there is provided a seat belt retractor for use in a motor vehicle, which comprises a housing; a take-up shaft rotatably mounted to the housing; biasing means for biasing the take-up shaft in a belt retracting direction to retract a seat belt; a gear mechanism operatively connected to the belt take-up shaft; a tensionless mechanism operatively connected to the gear mechanism and operable to cause the seat belt to assume a tensionless state wherein the take-up shaft is prevented from rotating in the belt retracting direction; a motor-actuated slack control mechanism operatively connected to the gear mechanism and operable to rotate the belt take-up shaft; first output means for controlling the tensionless mechanism and the motor-actuated slack control mechanism so as to provide the seat belt in a tensionless state with a desirable slack: belt position detecting means for outputting a signal representative of a newly set position of the seat belt when the vehicle is ready for a reverse driving; and second output means for actuating, based on the signal from the belt position detecting means, the tensionless mechanism so as to cause the seat belt in the newly set position to assume the tensionless state.

BRIEF DESCRIPTION OF THE DRAWINGS

Other objects and advantages of the present invention will become apparent from the following description when taken in conjunction with the accompanying drawings, in which:

FIGS. 5 through 8, each being a sectional view taken along the line A—A of FIG. 1, show various modes of operation of the seat belt retractor.

DETAILED DESCRIPTION OF THE INVENTION

Figure 2:
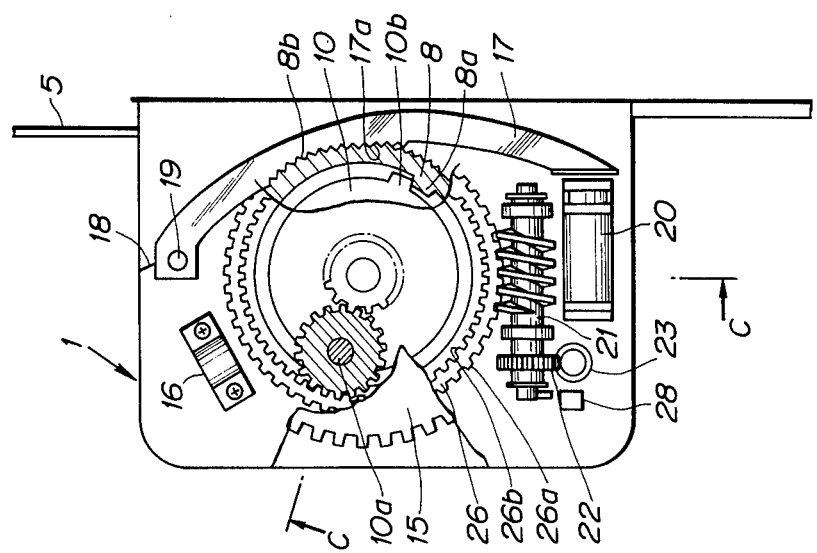
FIG. 2 is a side elevational view partly section taken along the line A—A and the line B—B of FIG. 1.
Figure 1:
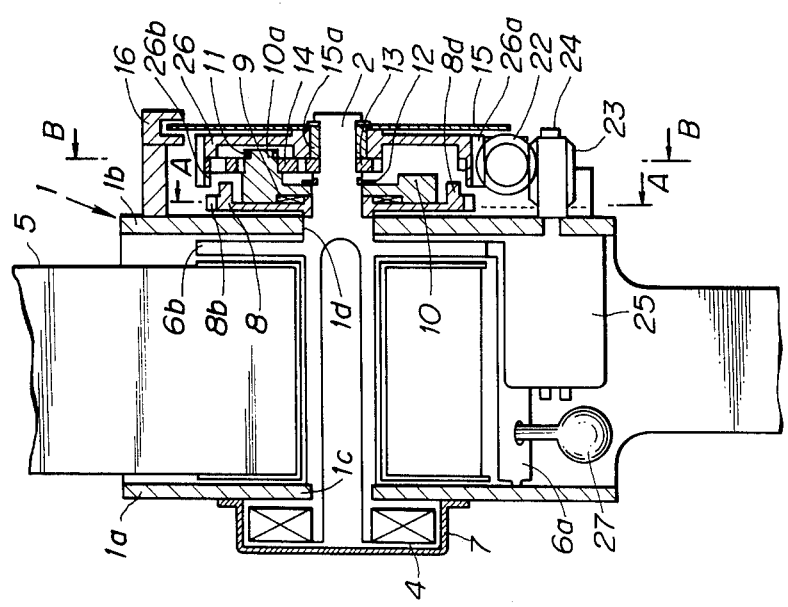
FIG. 1 is a diagrammatic cross sectional view taken along the line C—C of FIG. 2, showing a seat belt retractor according to the present invention.

Referring to FIGS. 1 and 2 of the drawings, there is shown a seat belt retractor according to the present invention, which comprises a housing 1 including two parallel side walls 1a and 1b. A belt take-up shaft 2 spans across the side walls 1a and 1b with its axially opposed end portions rotatably received in aligned apertures 1c and 1d formed in the side walls 1a and 1b. The take-up shaft 2 is biased by a return spring 4 in a belt retracting direction, that is, in a clockwise direction as viewed in FIG. 2. The return spring 4 is in the form of a spiral spring having an outer end hooked to a spring cover 7 mounted to the side wall 1a and an inner end anchored to the take-up shaft 2. The seat belt retractor further comprises a rathet wheel 6b integral with the take-up shaft 2, a lever 6a formed with a pawl 6c adapted to engage with the ratchet wheel 6b and a weight 27 which constitute a known emergency locking mechanism.

One axial end portion of the take-up shaft 2 is projected outward from the side wall 1b, which is reduced in diameter, as shown in FIG. 1. The reduced end portion of the take-up shaft 2 carries thereon a first gear 8 which is rotatable relative to the shaft 2. The first gear 8 is formed with external teeth 8b and further has an annular wall section 8d formed with an inwardly extending projection 8a as is best seen from FIG. 2. Disposed within the annular wall section 8d is a carrier wheel 10 which is rotatably disposed on the take-up shaft 2 and held by a snap ring 12. As is seen from FIG. 2, the carrier wheel 10 is formed with an outwardly extending projection 10b adapted to abut with the projection 8a of the first gear 8. The carrier wheel 10 is biased by a spiral spring 9 in a clockwise direction as viewed in FIG. 2 thereby to maintain the engagement between the projections 10b and 8a. As is seen from FIG. 1, the spiral spring 9 is arranged between the first gear 8 and the carrier wheel 10.

The carrier wheel 10 is provided with a pin 10a on which a planetary gear 14 is rotatably disposed. A snap ring 11 is fixed to the pin to hold the planetary gear 14.

The planetary gear 14 meshes with a sun gear 13 which is coaxially fixed to the belt take-up shaft 2.

The axial end of the take-up shaft 2 is provided with a slit wheel 15 coaxially secured thereto through a connecting boss 15a. As is seen from FIG. 1, at the inboard side of the slit wheel 15, there is a second gear 26 (or ring gear) which is rotatably disposed on the boss 15a. The second gear 26 has an annular wall section which is formed with both external teeth 26a and internal teeth 26b. The internal teeth 26b mesh with the afore-mentioned planetary gear 14.

Thus, the sun gear 13, the planetary gear 14 and the second gear 26 constitute a planetary gearing which is carried by the carrier wheel 10.

An electric motor 25 is mounted to the housing 1 of the retractor, which has a driving shaft 24 on which a first worm 23 is securely mounted. The first worm 23 meshes with a first worm wheel 22 coaxially and securely mounted on a second worm 21 which meshes with the external teeth 26a of the second gear 26.

Referring to FIG. 2, a stopper lever 17 is pivotally connected at its one end to the side wall 1b through a pivot pin 19. The stopper lever 17 is formed with teeth 17a which are adapted to lockably engage with the external teeth 8b of the first gear 8. The stopper lever 17 is biased by a spring 18 toward a disengaged position, that is, in a counterclockwise direction as viewed in FIG. 2. The stopper lever 17 has a free end adapted to be attracted by a solenoid 20, that is, an electromagnet, when the latter is energized. Thus, upon energization of the solenoid 20, the stopper lever 17 is pivoted against the spring 18 in a direction to engage the external teeth 8b of the first gear 8 thereby to lock the same.

For the purpose of detecting a rotation angle of the belt take-up shaft 2, there is provided a first known angle sensor which comprises the slit wheel 15 and a slit counter 16. Measuring the number of slits of the slit wheel 15, the counter 16 outputs a signal representative of the rotation angle of the take-up shaft 2. As will become apparent as the description proceeds, the first angle sensor can also serve as a detecting means which detects the state of the seat belt 5 put on the seat occupant. For the same purpose, a second known angle sensor 28 is provided, which is designed to detect the angle of rotation of the take-up shaft 2 induced by operation of the electric motor 20. These detectors 16 and 28 are described in U.S. Pat. No. 4,534,441 granted on Aug. 13, 1985 (Nissan Motor Co., Ltd.).

Figure 3:
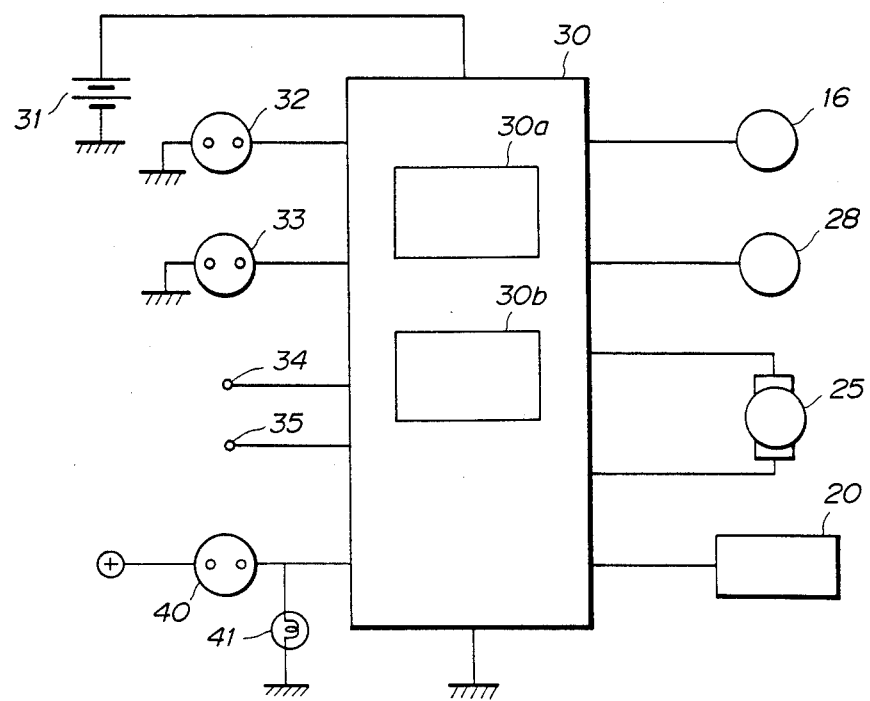
FIG. 3 is a block diagram of a control unit of the seat belt retractor of the invention.

The electric motor 25 and the solenoid 20 are actuated under the control of a control unit 30 as shown in FIG. 3. The control unit 30 comprises a microcomputer including, as usual, a CPU, an I/O interface, a RAM, a ROM and a timer. The ROM stores a program depicted by the flowcharts shown in FIGS. 4A to 4C or 4D.

Referring to FIG. 3, the reference numeral 31 denotes a battery as a source for operating the control unit 30 which includes generally a first output means 30a and a second output means 30b. The control unit 30 receives information signals from the first and second angle sensors 16 and 28, a buckle switch 32, a seat switch 33, a vehicle speed sensor 34, a low G sensor 35 and a reverse lamp switch 40. The buckle switch 32 is turned ON when the tongue and the buckle of the seat belt 5 are coupled. The seat switch 33 is kept OFF when a seat sliding mechanism associated with a seat is under operation. The seat switch of this type is known from U.S. Pat. No. 4,384,735. The vehicle speed sensor 34 is known from page V-20 of Service Periodical No. 491 issued by Nissan Motor Co., Ltd. Briefly describing, the vehicle speed sensor 34 converts the rotation of a speed meter cable to a train of pulses. The low G-sensor 35 detects a negative acceleration of the vehicle, which is shown in U.S. Pat. No. 4,534,441. The reverse lamp switch 40 is turned ON when a shift lever of a transmission (not shown) is shifted to the reverse position. Upon the switch 40 assuming ON, a reverse lamp 41 is lighted.

The first output means 30a of the control unit 30 is constructed to control operation of the motor 25 and the solenoid 20 so as to provide the seat belt put on by the seat occupant with a desired slack. The second output means 30b is constructed to energize the solenoid 20 upon receiving output from the first angle sensor 16.

Outputs from the control unit 30 are applied to the motor 25 and the solenoid 20.

In the following, the operation of the seat belt retractor will be described along the flowcharts shown in FIGS. 4A to 4C with an aid of FIGS. 5 to 8.

For ease of description, it will be commenced with respect to a condition wherein the seat belt 5 is fully retracted by the take-up shaft 2 under the work of the return spring 4.

Figure 4A:
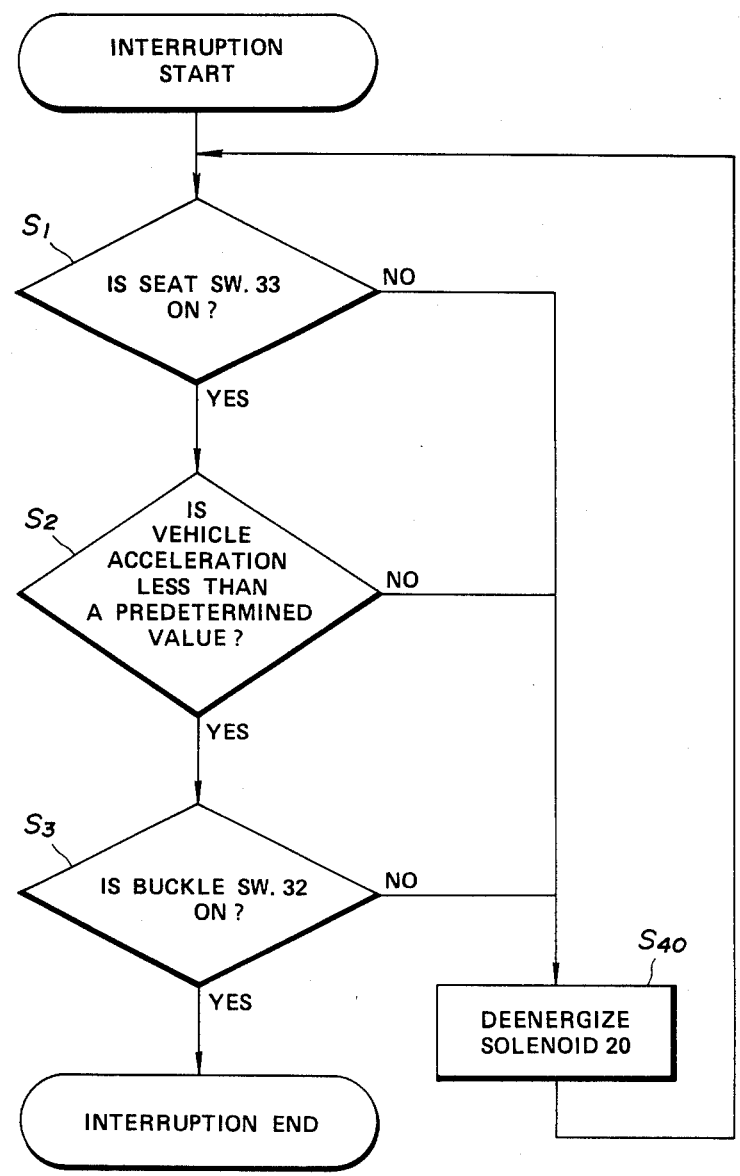
FIGS. 4A through 4C are flowcharts illustrating the operation carried out by the control unit.
Figure 5:
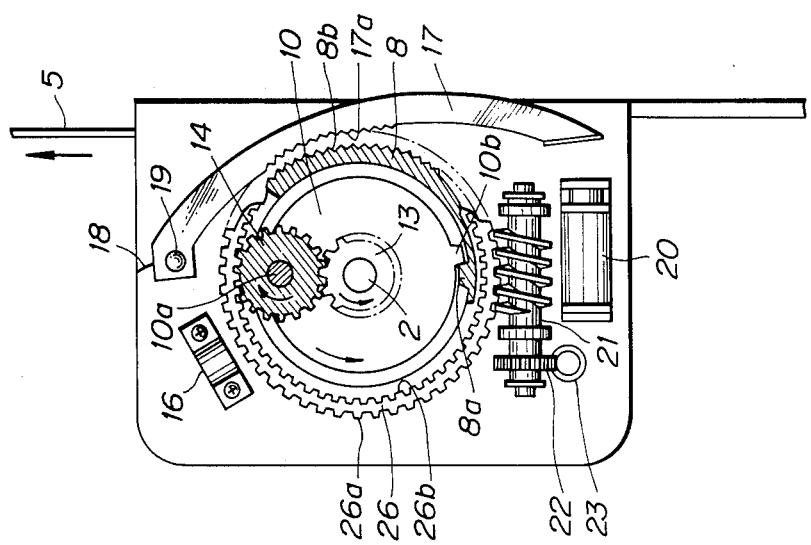

(1) When a passenger is seated, an interruption routine starts along the flowchart shown in FIG. 4A. While the seat occupant is selecting his or her appropriate seat position by manipulating the seat sliding mechanism, the seat switch 33 is kept OFF. Thus, the answer to the question in the step $S_1$ is NO, so that the program proceeds to the step $S_{40}$ whereby the first output means 30a issues "solenoid OFF signal". Thus, the solenoid 20 is not energized, thus leaving the stopper lever 17 disengaged from the first gear 8 under the action of the spring 18. When the seat adjustment is completed, the seat switch 33 is turned ON, the program proceeds from the step $S_1$ to the step $S_2$ where a determination is made by checking the output from the low G sensor 35 whether the vehicle acceleration is less than a predetermined value or not. Since the vehicle is at standstill, the answer is YES, so that the program proceeds to the step $S_3$ where a determination is made whether the buckle switch 32 is ON or not. Since the buckle switch 32 is OFF before the seat occupant wears the belt 5, the program proceeds to the step $S_{40}$ causing the deenergization of the solenoid 20. Thus, the stopper lever 17 remains in the disengaged position. Under this condition, the belt take-up shaft 2 can rotate in both directions, i.e., in the belt retracting direction under the action of the return spring 4 and in the belt feeding direction against the action of the spring 4. This is because, under this condition, the first gear 8, the carrier wheel 10, the planetary gear 14, the sun gear 13 and the take-up shaft 2 can rotate or orbit in both directions irrespective of the fixed state of the second gear 26 meshed with the second worm 21. More specifically, even when the second gear 26 is fixed, the rotation of the sun gear 13 secured to the take-up shaft 2 can cause the planetary gear 14 to travel along the internal teeth 26b of the second gear 26 rotating the carrier plate 10 and thus the first gear 8 (which is connected to the carrier plate 10 through the spiral spring 9) about the axis of the take-up shaft 2. Thus, the seat belt 5 can be pulled out of the seat belt retractor in a manner as is shown in FIG. 5. As is seen from this drawing, when the seat belt 5 is pulled, the take-up shaft 2 and the sun gear 13 are rotated counterclockwise, that is, in the belt feeding direction, causing the planetary gear 14 to rotate clockwise about the pin 10a and orbit counterclockwise, thus causing the carrier wheel 10 and thus the first gear 8 to rotate counterclockwise. It will be thus understood that the rotation of the take-up shaft 2 in the belt feeding direction is allowed because the orbiting movement of the planetary gear 14 is not restrained although the rotation of the second gear 26 is prevented.

Figure 4B:
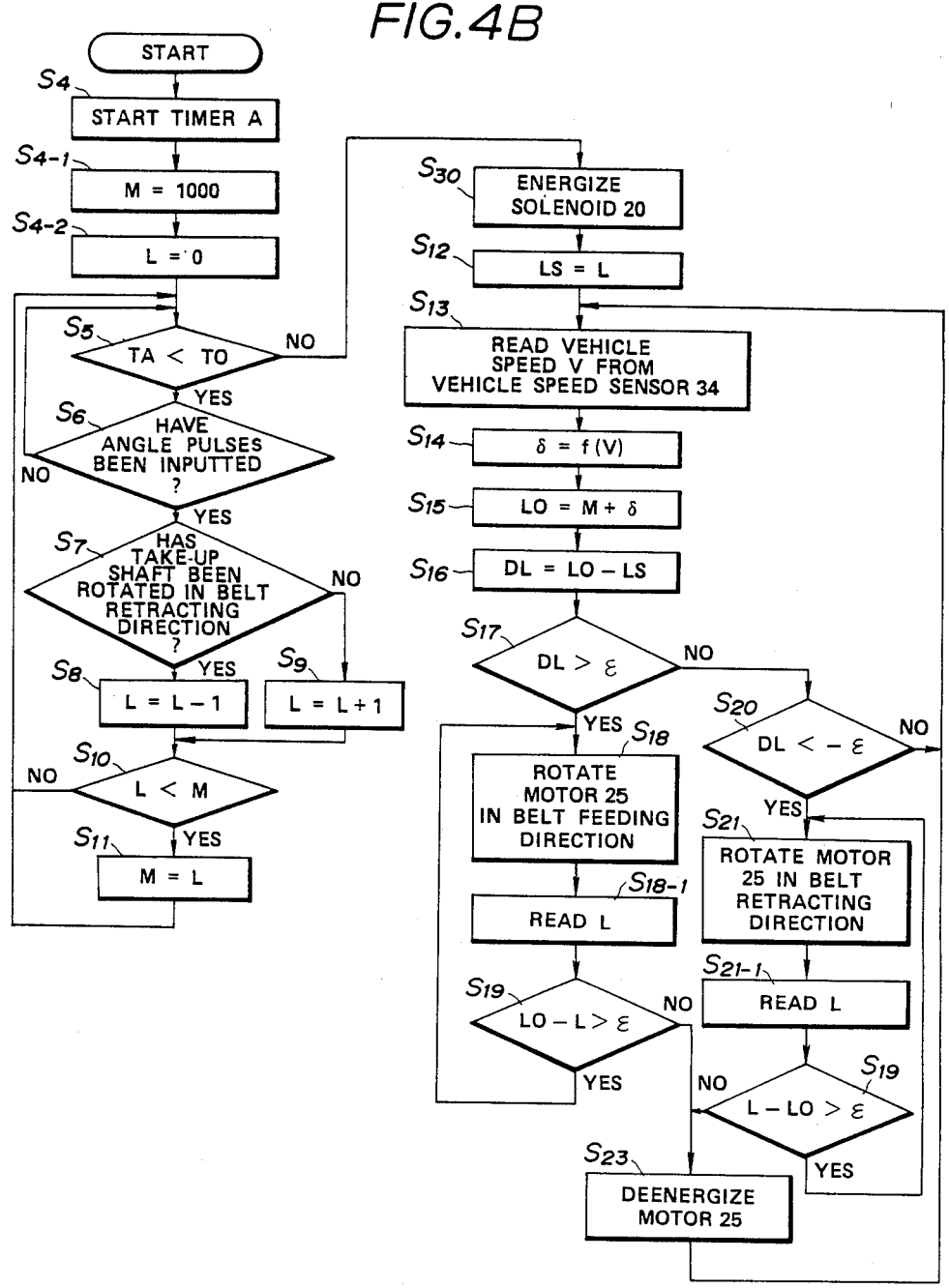

(2) When the seat belt 5 is drawn out by a certain amount and the tongue of the seat belt 5 is coupled with the buckle for putting the sea belt 5 around the seat occupant, the buckle switch 32 is turned ON causing start of a main routine along the flowchart as shown in FIG. 4B. Upon this, the program proceeds to the step $S_4$ where the timer A is started. A predetermined period of time TO, such as around 10 seconds, is set in the timer A. This period of time is empirically determined on the recognition that the seat occupant will finish arranging his or her posture within this period of time after coupling the tongue with the buckle. After execution of the step $S_4$, the program proceeds to a step $S_{4-1}$ where a minimumly drawn belt length M (hereinafter, which will be refered to as reference belt length M) is given 1000 in terms of an angle of rotation of the take-up shaft 2 and to a step $S_{4-2}$ where an actually drawn belt length L is given zero. After setting M and L, the program proceeds to a step $S_5$ where a determination is made whether the timer value TA is less than TO (i.e., 10 seconds) or not. In this step $S_5$, the elapsed time TA after the coupling of the tongue with the buckle is checked. If the time value TA is less than TO, the program proceeds from the step $S_5$ to a step $S_6$ where a determination is made whether or not the angle pulses have been inputted from the first and second angle sensors 16 and 28. If the answer to the question in the step $S_6$ is NO, the program returns to the step $S_5$, while, if the answer is YES, the program proceeds to a step $S_7$ where a determination is made based on the pulses from the angular position sensors 16 and 28 whether or not the take-up shaft 2 has been rotated in the belt retracting direction, i.e., in the clockwise direction as viewed in FIG. 6. If the answer to the question in the step $S_7$ is YES, the program proceeds to a step $S_8$ where L is decreased by one, while, if the answer is NO, the program proceeds to step $S_9$ where L is increased by one. After execution of the step $S_8$ or $S_9$, a step $S_{10}$ is executed where a determination is made whether L is less than M or not. If L is less than M, the program proceeds to the step $S_{11}$ where the actually drawn belt length L is stored as a reference belt length M.

Under this condition, the solenoid 20 is not energized, so that the stopper lever 17 remains in the disengaged position. Thus, as mentioned hereinabove, the belt take-up shaft 2 can rotate under the action of the return spring 4 in the belt retracting direction, that is, clockwise as viewed in FIG. 6 so as to retract the belt 5, thus removing the slack, if any. Since the second gear 26 is fixed, the clockwise rotation of the take-up shaft 2 together with the sun gear 13 causes the first gear 8 and the carrier wheel 10 to rotate in the same direction and the planetary gear 14 to rotate in the reversed direction, i.e., counterclockwise. As a result, the slack is removed within the predetermined period of time TO (i.e., 10 seconds) after the seat occupant has coupled the tongue with the buckle.

When the timer value TA has exceeded the predetermined period of time TO, that is, when it is recognized that the seat occupant has finished arranging his or her posture, the program proceeds from the step $S_5$ to a step $S_{30}$ where electric current is applied to the solenoid 20 thereby energizing the same. Upon this, the stopper lever 17 is attracted by the solenoid 20 against the spring 18 and thus brought into locking engagement with the external teeth 8b of the first gear 8 thereby locking the same. The locking of the first gear 8 prevents further rotation of the carrier wheel 10 in the same direction (that is, in a clockwise direction) as the belt retracting direction of the belt take-up shaft 2 by the engagement of the outward projection 10b of the carrier wheel 10 with the inward projection 8a of the first gear 8. Preventing the clockwise rotation of the carrier wheel 10 means that the belt take-up shaft 2 can not rotate anymore in the belt retracting direction, i.e., clockwise as viewed in FIG. 7 because of the fixed state of the first gear 8 and the second gear 26. More particularly, under this condition, the belt take-up shaft 2 is permitted to rotate only in the belt feeding direction, i.e., counterclockwise as viewed in FIG. 7 because the counterclockwise rotation of the carrier wheel 10 inducing travelling of the planetary gear 4 around the sun gear 13 in the counterclockwise direction is only permitted. Thus, the tensionless state is established in the belt retractor.

(3) Automatic provision of an appropriate belt slack after establishment of the tensionless state is carried out thereafter.

Referring back to the flowchart of FIG. 4B, after executing the step $S_{30}$, a step $S_{12}$ is executed where the angle of rotation L (viz., the actually drawn belt length) at the time when the solenoid 20 is energized is stored as LS, and the program proceeds to a step $S_{13}$ where vehicle speed V is read from the vehicle speed sensor 34 and to a step $S_{14}$ Where an appropriate slack $\delta$ of the belt is arithmatically determined by an equation $\delta = f(V)$, which slack $\delta$ is variable in accordance with the vehicle speed V. Then, a step $S_{15}$ is executed where the reference belt length M is added to the appropriate slack $\delta$ to provide a desired slack-provided belt length LO, and the program roceeds to a step $S_{16}$ where a difference DL is obtained by subtracting LS from LO. Then, the program proceeds to a step $S_{17}$ where a determination is made whether or not the difference DL is greater than a small value $\epsilon$, where the small value $\epsilon$ is set so as to prevent occurrence of hunting operation. If DL is greater than $\epsilon$, the program proceeds to a step $S_{18}$ where an instruction signal is produced to rotate the motor 25 in the belt feeding direction and to a step $S_{18-1}$ where a newly set rotation angle L (i.e., newly set actually drawn belt length) is read from the second angle sensor 28. Then, the program proceeds to a step $S_{19}$ where a determination is made whether a difference, i.e., a subtraction of L from LO, is greater than the small value $\epsilon$ or not. If the difference is greater than $\epsilon$, the program returns to the step $S_{18}$ to rotate the motor 25 further in the belt feeding direction until the difference LO-L becomes equal to or less than the small value $\epsilon$. If the answer to the question in step $S_{19}$ is NO. the program proceeds to a step $S_{23}$ where, based on the output from the first output means 30a, the rotation of the motor 25 is stopped and thereafter the program returns to the step $S_{13}$.

If, in the step $S_{17}$, the difference DL is equal to or less than $\epsilon$, the program proceeds to a step $S_{20}$ where a determination is made whether the difference DL is less than $-\epsilon$ or not. If the answer to the step $S_{20}$ is NO, the program returns to the step $S_{13}$. That is, the motor 25 remains unactuated because the difference DL is within an allowable range. If the answer to the question in the step $S_{20}$ is YES, the program proceeds to a step $S_{21}$ where, based on the output from the first output means $30a$, the motor 25 is rotated in the belt retracting direction, and then a step $S_{21-1}$ is executed where a newly set rotation angle L (i.e., newly set actually drawn belt length) is read from the second angle sensor 28. After executing the step $S_{21-1}$, a step $S_{22}$ is executed where a determination is made whether or not a difference. i.e., a subtraction of LO from L, is greater than the small value ε. If the difference L-LO is greater than the small value ε, the program returns to the step $S_{21}$, while. if the difference L-LO is equal to or less than the small value ε, the program proceeds to the step $S_{23}$ to stop the rotation of the motor 25 and thereafter the program returns to the step $S_{13}$. With the execution of the flow including the steps $S_{13}$ to $S_{23}$, a desired slack is automatically provided to the seat belt 5.

At the step $S_{18}$, the seat belt retractor operates in a manner as shown in FIG. 7, that is, the retractor operates to feed the seat belt 15 therefrom. Energization of the motor 25 rotates through the second worm 21 the second gear 26 in a clockwise direction. Under this condition, the carrier wheel 10 is prevented from rotating in the same direction as the second gear 26 because of engagement of the outward projection 10b of the carrier wheel 10 with the inward projection 8b of the first gear 8 which is kept locked by the locking lever 17, so that the planetary gear 14 is forced to rotate clockwise about the pin 10a without making the orbital movement about the sun gear 13. The clockwise rotation of the planetary gear 14 rotates the sun gear 13 and thus the belt take-up shaft 2 in the counterclockwise direction, i.e. in the belt feeding direction. Thus, the seat belt is drawn out until the motor 25 is stopped. That is, the motor 25 is kept energized to rotate the take-up shaft 2 in the belt feeding direction until the desired slack-provided belt length LO is established (a flow along the steps $S_{18}$, $S_{19}$ and $S_{23}$).

In the step 21, the following operation is carried out in the belt retractor. Upon energization, the electric motor 25 rotates in the reversed direction causing the second gear 26 to rotate counterclockwise as viewed in FIG. 7. This rotation of the second gear 26 causes the planetary gear 14 to rotate counterclockwise about the pin 10 and to orbit counterclockwise about the sun gear 13. Although the planetary gear 14 can orbit counterclockwise, an angle through which the gear 14 can orbit in this direction is limited by the presence of the spring 9 disposed between the first gear 8 and the carrier wheel 10 (see FIG. 1). Thus, after the planetary gear 14 moves along the orbit through the limited angle in the counterclockwise direction, the planetary gear 14 is prevented from orbiting further in the same direction. As a result, the counterclockwise rotation of the planetary gear 14 causes the sun gear 13 and thus the belt take-up shaft 2 in the clockwise direction, that is, in the belt retracting direction. The electric motor 25 is kept energized to rotate the take-up shaft 2 in the belt retracting direction until the desired slack-provided belt length LO is established (a flow along the steps $S_{21}$, $S_{22}$ and $S_{23}$).

(4) When the seat occupant changes his or her posture in order to, for example, take out an article from a glove box, the seat belt retractor feeds the seat belt 5 in a manner a will be described hereinnext with reference to FIG. 8.

Since the planetary gear 14 is allowed to orbit against the spring 9 counterclockwise through the limited angle, the take-up shaft 2 together with the sun gear 13 can rotate counterclockwise although the second gear 26 is fixed as engaged with the worm 21, thus allowing the seat belt 5 to be pulled out of the seat belt retractor so as to follow the change in posture of the seat occupant. Thus, the counterclockwise rotation of the sun gear 13 causes the planetary gear 14 to rotate clockwise, rotating the carrier wheel 10 counterclockwise against the action of the spring 9. The angle of the counterclockwise rotation of the carrier wheel 10 in this circumstances is limited by the spring 9. However, since the sun gear 13 can make R turns as the carrier wheel 10 makes a single turn. R can be expressed as:

$R = 1 +$ (the number of teeth 26b of the second gear 26)/(the number of the sun gear 13).

Thus, suitably selecting the number of the teeth, the maximum feeding length of the seat belt 5 upon following the change in posture of the seat occupant can be set to a practical feasible value. When the seat occupant resumes his or her original posture, the take-up shaft 2 and the sun gear 13 rotate clockwise as viewed in FIG. 8 owing to the action of the return spring 4, causing the planetary gear 14 to orbit clockwise while rotating counterclockwise until the carrier wheel 10 assumes the position where the projection 10b engages the projection 8a of the first gear 8. The tensionless state is established when the seat occupant assumes his or her original posture.

(5) The tensionless state is released and the seat belt 5 fits around the seat occupant when the vehicle decelerates rapidly or makes a sharp turn or passes through a rough terrain:

Referring again to the flowchart of FIG. 4A, the low G sensor 35 generates a signal (step $S_2$) when the vehicle encounters the above-mentioned condition. Upon receiving this signal, the first output means $30a$ of the control unit 30 cuts off the current applied to the solenoid 20, thereby deenergizing the same (step $S_{40}$). When the solenoid 20 is deenergized, the stopper lever 17 is disengaged from the first gear 8 due to the action of the spring 18. This allows the carrier wheel 10 to rotate further in the same direction as the belt retracting direction of the take-up shaft 2. Since, now, the planetary gear 14 can rotate, the take-up shaft 2 is rotated in the belt retracting direction by the return spring 4, applying a tension on the seat belt 5, thus releasing the tensionless state.

(6) When the vehicle is in a state ready for reverse movement, the following operation is carried out.

Figure 4C:
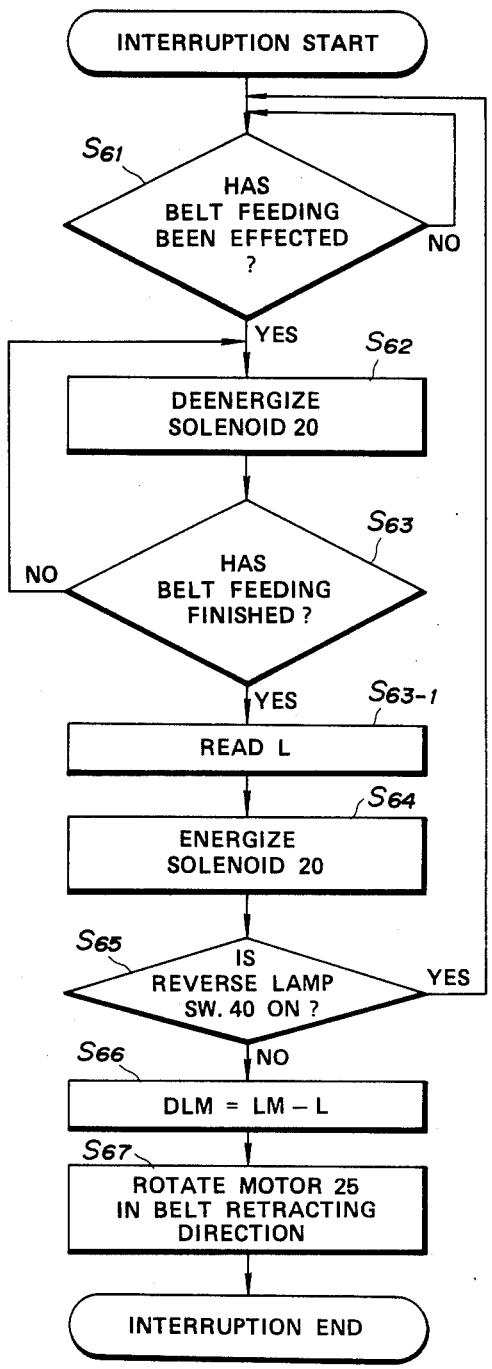

That is, when the vehicle is in such a state, an interruption routine starts along the flowchart shown in FIG. 4C. When a shift lever is shifted to the reverse position, the reverse lamp switch 40 is turned ON thereby lighting the reverse lamp 41 and feeding the control unit 30 with "reverse ON signal". Upon this, the interruption routine starts and the actually drawn belt length L in terms of the rotation angle of the take-up shaft 2 is stored in a RAM of the control unit 30.

When the seat occupant (or driver) wearing the seat belt 5 turns back for driving the vehicle in reverse, the belt 5 is forced to be pulled out somewhat from the retractor. This belt feeding is carried out in such a manner as has been explained in the description of operation (4), and detected by the first angle sensor 16. Thus, the answer to the question in a step $S_{61}$ is YES, and thus the program proceeds from the step $S_{61}$ to a step $S_{62}$ where "current cut OFF signal" is issued from the second output means $30b$ of the control unit 30 to cut off current to the solenoid 20 thereby deenergizing the same. With this, under action of the spring 18, the stopper lever 17 is disengaged from the first gear 8 to permit free rotation of the same, as is seen from FIG. 6. Accordingly, the seat belt 5 can be freely pulled out or retracted by the retractor, as has been explained in the description of operation (1), following the change in posture of the seat occupant. Then, the program proceeds to a step $S_{63}$ where a determination is made as to whether the belt feeding has finished or not in order to update the data of the position of the seat belt. If the posture change of the seat occupant is going on, the answer to the question in the step $S_{62}$ is NO, so that the solenoid 20 is kept deenergized. When the answer in the step $S_{63}$ is YES, the program proceeds to a step $S_{63-1}$ where the newly set actually drawn belt length L is read and stored as a maximumly drawn belt length LM in terms of rotation angle of the belt take-up shaft 2, and then the program proceeds to a step $S_{64}$ where "current apply signal" is issued from the second output means 30b thereby energizing the solenoid 20. With this, like the case of the afore-mentioned operation (3), a tensionless state is established in the seat belt 5, so that the driver can effect the reverse driving of the vehicle without suffering an uncomfortable tension from the seat belt 5.

When, thereafter, the shift lever is returned from the reverse position to a neutral position after the driver has returned back to his or her normal driving position, the reverse lamp switch 40 is turned OFF. The turning OFF operation is detected at a step $S_{65}$ where a determination is made whether the reverse lamp switch 40 is ON or not. Thus, the answer to the question in the step $S_{65}$ is NO, so that the program proceeds to a step $S_{66}$ where the maximumly drawn belt length LM is decreased by the actually drawn belt length L which was stored before the posture change of the driver for the reverse driving to provide a difference DLM therebetween. Then, a step $S_{67}$ is executed where the electric motor 25 is rotated in the belt retracting direction by a degree corresponding to the difference DLM so that the belt length is reduced to the amount of L. After execution of the step $S_{67}$, the program returns to the main routine of the flowchart of FIG. 4B.

A modification may be employed in which when the answer to the question in the step $S_{65}$ is NO, deenergization of the motor 25 is kept and the solenoid 20 is deenergized thereby to allow the belt retractor to retract the seat belt 5 under action of the return spring 4.

When the change in posture of the seat occupant is going on in a stepwise manner, YES is issued from the step $S_{63}$ every time the pulling out action of the seat belt 5 stops, so that so long as the reverse lamp switch 40 is kept ON, the operation along the steps $S_{61}$ to $S_{65}$ is repeated. Since the stepwise posture change whould stop when the driver comes to his or her stable position for the reverse driving, the repeating of the operation brings about a condition wherein the solenoid 20 is deenergized at the time when the seat belt 5 has been drawn out to such an amount as to have the maximumly drawn belt length M. Thus, the tensionless state can be established in the seat belt 5. That is, every time the pulling out action of the seat belt 5 stops, the length of the belt then established is stored as a maximumly drawn belt length LM in terms of rotation angle of the belt take-up shaft 2. This value LM is updated or replaced with a current value LM when a subsequent pulling out action is effected, so that finally, the length of the belt 5 which is maximumly drawn out from the retractor is stored as the value LM. Accordingly, the operation at the step $S_{66}$ is not affected.

(7) When the tongue is disengaged from the buckle, the belt 5 is retracted by the retractor:

When the seat occupant disengages the tongue from the buckle in order to get off the vehicle, the interruption routine of FIG. 4A starts and the buckle switch 32 is turned OFF. In this case, the answer to the question in the step $S_3$ is NO, so that the program proceeds to the step $S_{40}$ where the solenoid 20 is deenergized, based on the output from the first output means 30a. The deenergization of the solenoid 20 establishes a state wherein the take-up shaft 2 is allowed to rotate in the belt retracting direction under the action of the return spring 4. As a result, the take-up shaft 2 can rotate in the belt retracting direction until the seat belt 5 is fully stored into the housing 1 of the seat belt retractor.

Figure 4D:
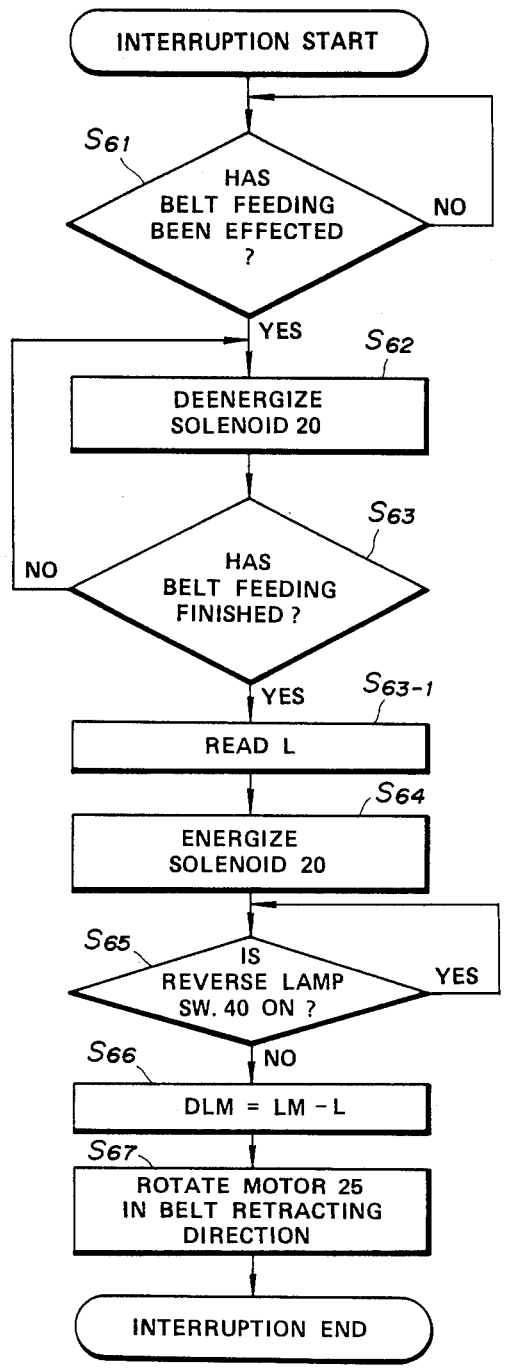
FIG. 4D is a flowchart illustrating a modified operation with respect to the flowchart of FIG. 4C.
Figure 6:
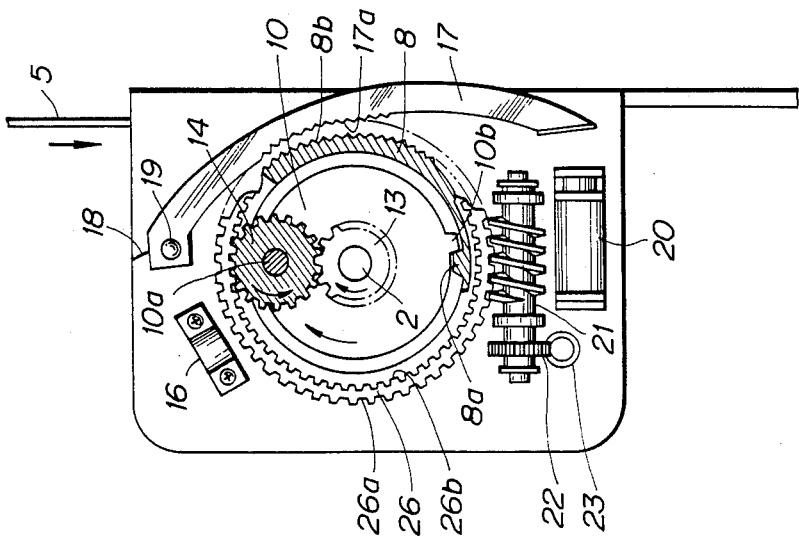

If desired, the operation of the interruption routine for the reverse driving (the flowchart of FIG. 4C) may be replaced with an operation executed along the flowchart of FIG. 4D.

That is, in the step $S_{65}$, if the answer is YES, the same question is repeated until the reverse lamp switch 40 is turned OFF, that is, until the shift lever is returned to the neutral position. Thus, once the belt feeding due to the posture change of the belt wearer has finished, the length of the belt then detected is judged as the maximumly drawn belt length LM and this value LM is kept unchanged until the end of the interruption routine.

According to the seat belt retractor as described hereinabove, under normal driving posture of the driver (seat occupant), an appropriate slack is provided depending upon a vehicle speed to secure the safety of him or her under control of the first output means 30a, and upon detection of posture change of the driver for the reverse driving, a tensionless state is established in the retractor with the seat belt which has been drawn out by a certain amount due to the posture change of the driver, under control of the second output means 30b.

Thus, the driver can drive the vehicle in reverse direction without suffering the uncomfortable tension applied by the seat belt.

What is claimed is:

1. A seat belt retractor for use in a motor vehicle, comprising:
   a housing;
   a belt take-up shaft rotatably mounted to said housing;
   biasing means for biasing said take-up shaft in a belt retracting direction to retract a seat belt;
   a gear mechanism operatively connected to said belt take-up shaft;
   a tensionless mechanism operatively connected to said gear mechanism and operable to cause the seat belt to assume a tensionless state wherein said take-up shaft is prevented from rotating in the belt retracting direction;
   a motor-actuated slack control mechanism operatively connected to said gear mechanism and operable to rotate said belt take-up shaft;
   first output means for controlling said tensionless mechanism and said motor-actuated slack control mechanism so as to provide the seat belt in a tensionless state with a desired slack;
   belt position detecting means for outputting a signal representative of a newly set position of the seat belt when the vehicle is ready for reverse driving; and second output means for actuating, based on the signal from the belt position detecting means, said tensionless mechanism so as to cause the seat belt in the newly set position to assume the tensionless state.

2. A seat belt retractor as claimed in claim 1, further comprising reverse position detecting means which outputs a signal when the vehicle is ready for the reverse driving.

3. A seat belt retractor as claimed in claim 2, in which said reverse position detecting means comprises a reverse lamp switch which is responsive to shifting of a shift lever of a transmission of the vehicle.

4. A seat belt retractor as claimed in claim 3, in which said reverse lamp switch is turned ON when the shift lever is shifted to a reverse position of the transmission.

5. A seat belt retractor as claimed in claim 3, in which said first and second means are arranged in a microcomputer.

6. A seat belt retractor as claimed in claim 1, in which said gear mechanism comprises a planetary gearing which includes a sun gear coaxially secured to said take-up shaft, a ring gear rotatably disposed on said take-up shaft and a planetary gear meshing with both said sun gear and said ring gear;

said tensionless mechanism being operable to prevent said planetary gear from orbiting in the same direction as said belt retracting direction of the take-up shaft; and said motor actuated slack control mechanism meshing with said ring gear and being operable to rotate said ring gear.

7. A seat belt retractor as claimed in claim 6, in which said tensionless mechanism includes a carrier wheel serving as a carrier for said planetary gear and having a projection, a ratchet wheel rotatably mounted on said take-up shaft and having a projection, means for biasing said projection of said carrier wheel into engagement with the projection of the ratchet wheel, a stopper lever movable to engage with said ratchet wheel to lock the same, and a solenoid means for attracting said stopper lever into the locking engagement with said ratchet wheel.

8. A seat belt retractor for use in a motor vehicle comprising:

a housing;

a belt take-up shaft rotatably mounted to said housing;

biasing means for biasing said take-up shaft in a belt retracting direction to retract a seat belt;

a tensionless means for causing the seat belt to assume a tensionless state wherein said take-up shaft is prevented from rotating in the belt retracting direction;

a motor actuated slack control means for rotating said belt take-up shaft;

first output means for controlling said tensionless means and said motor actuated slack control means so as to provide the seat belt in a first set position in a tensionless state with a desired slack;

belt position memory means;

means for storing in said memory means a first signal representing the first set position;

belt position detecting means for outputting a second signal representative of a newly set position of the seat belt when the vehicle is ready for reverse driving;

means for storing the second signal in said memory means;

second output means for actuating said tensionless means based on the second signal from said memory means so as to cause the seat belt in the newly set position to assume the tensionless state; and means for actuating said biasing means, tensionless means, and motor actuated slack control means based upon said first signal from said memory means to retract said belt to said first set position in a tensionless state after completion of reverse driving.

* * * * *